(12) United States Patent
Cargnelli et al.

(10) Patent No.: US 6,916,567 B2
(45) Date of Patent: **\*Jul. 12, 2005**

(54) REGENERATIVE DRYER DEVICE AND METHOD FOR WATER RECOVERY, PRIMARILY IN THE CATHODE SIDE, OF A PROTON EXCHANGE MEMBRANE FUEL CELL

(75) Inventors: Joe Cargnelli, Toronto (CA); Jianming Ye, Woodbridge (CA); Xuesong Chen, Brampton (CA); Ravi B. Gopal, Oakville (CA); David Frank, Scarborough (CA)

(73) Assignee: Hydrogenics Corporation, Mississauga (CA)

( * ) Notice: Subject to any disclaimer, the term of this patent is extended or adjusted under 35 U.S.C. 154(b) by 140 days.

This patent is subject to a terminal disclaimer.

(21) Appl. No.: 10/223,706

(22) Filed: Aug. 20, 2002

(65) Prior Publication Data

US 2003/0031906 A1 Feb. 13, 2003

Related U.S. Application Data

(63) Continuation-in-part of application No. 09/941,934, filed on Aug. 30, 2001, and a continuation-in-part of application No. PCT/CA01/00851, filed on Jun. 13, 2001.

(51) Int. Cl.$^7$ ................................................ H01M 8/12
(52) U.S. Cl. ............................ 429/26; 429/34; 429/38
(58) Field of Search ........................... 429/34, 38, 39, 429/22, 20, 26, 17, 120

(56) References Cited

U.S. PATENT DOCUMENTS

| 4,093,435 | A | | 6/1978 | Marron et al. |
|---|---|---|---|---|
| 4,259,302 | A | | 3/1981 | Katz et al. |
| 4,362,789 | A | | 12/1982 | Dighe |
| 4,924,934 | A | | 5/1990 | Steele |
| 5,316,869 | A | | 5/1994 | Perry, Jr. et al. |
| 5,441,821 | A | | 8/1995 | Merritt et al. |
| 5,478,662 | A | | 12/1995 | Strasser |
| 5,543,238 | A | | 8/1996 | Strasser |
| 5,935,726 | A | | 8/1999 | Chow et al. |
| 6,013,385 | A | | 1/2000 | DuBose |
| 6,155,334 | A | | 12/2000 | Steele |
| 6,436,563 | B1 | * | 8/2002 | Frank et al. ............... 429/17 |
| 2004/0038100 | A1 | * | 2/2004 | Cargnelli et al. ............ 429/26 |

FOREIGN PATENT DOCUMENTS

JP         10-064569         6/1998

\* cited by examiner

*Primary Examiner*—Raymond Alejandro
(74) *Attorney, Agent, or Firm*—Bereskin & Parr

(57) ABSTRACT

Moisture recovery and humidification in a fuel cell system involving (i) intermittently switching each dryer in a plurality of dryers into and out of one of a first mode of operation for recovering moisture from an outgoing oxidant stream and a second mode of operation for humidifying an incoming oxidant stream such that during use at least one dryer is in the first mode of operation and at least one dryer is in the second mode of operation; (ii) directing the outgoing oxidant stream from the cathode through at least one dryer in the first mode of operation to recover moisture from the outgoing oxidant stream; and (iii) directing the incoming oxidant stream through at least one dryer in the second mode of operation to humidify the incoming oxidant stream with moisture.

35 Claims, 10 Drawing Sheets

REGENERATIVE DRYER DEVICE AND METHOD FOR WATER RECOVERY, PRIMARILY IN THE CATHODE SIDE, OF A PROTON EXCHANGE MEMBRANE FUEL CELL

RELATED APPLICATIONS

This application is a continuation-in-part of co-pending U.S. patent application Ser. No. 09/941,934, filed Aug. 30, 2001, and is also a continuation-in-part of International Application No. PCT/CA01/00851, filed Jun. 13, 2001, and published in English under International Publication No. WO 01/97307 on Dec. 20, 2001.

FIELD OF THE INVENTION

This invention relates to electrochemical fuel cells. More particularly, this invention relates to electrochemical fuel cells incorporating a regenerative dryer device for recovering water and humidifying a reactant stream of the fuel cell.

BACKGROUND OF THE INVENTION

Generally, a fuel cell is a device which converts the energy of a chemical reaction into electricity. It differs from a battery in that the fuel cell can generate power as long as the fuel and oxidant are supplied.

A fuel cell produces an electromotive force by bringing the fuel and oxidant into contact with two suitable electrodes and an electrolyte. A fuel, such as hydrogen gas, for example, is introduced at a first electrode where it reacts electrochemically in the presence of the electrolyte and catalyst to produce electrons and cations in the first electrode. The electrons are circulated from the first electrode to a second electrode through an electrical circuit connected between the electrodes. Cations pass through the electrolyte to the second electrode. Simultaneously, an oxidant, typically air, oxygen enriched air or oxygen, is introduced to the second electrode where the oxidant reacts electrochemically in presence of the electrolyte and catalyst, producing anions and consuming the electrons circulated through the electrical circuit; the cations are consumed at the second electrode. The anions formed at the second electrode or cathode react with the cations to form a reaction product. The first electrode or anode may alternatively be referred to as a fuel or oxidizing electrode, and the second electrode may alternatively be referred to as an oxidant or reducing electrode. The half-cell reactions at the two electrodes are, respectively, as follows:

The external electrical circuit withdraws electrical current and thus receives electrical power from the cell. The overall fuel cell reaction produces electrical energy which is the sum of the separate half-cell reactions written above. Water and heat are typical by-products of the reaction.

In practice, fuel cells are not operated as single units. Rather, fuel cells are connected in series, stacked one on top of the other, or placed side by side. A series of fuel cells, referred to as a fuel cell stack, is normally enclosed in a housing. The fuel and oxidant are directed through manifolds to the electrodes, while cooling is provided either by the reactants or by a cooling medium. Also within the stack are current collectors, cell-to-cell seals and, insulation, with required piping and instrumentation provided externally of the fuel cell stack. The stack, housing, and associated hardware make up the fuel cell module.

Fuel cells may be classified by the type of electrolyte, either liquid or solid. The present invention is primarily concerned with fuel cells using a solid electrolyte, such as a proton exchange membrane (PEM). The PEM has to be kept moist with water because the available membranes will not operate efficiently when dry. Consequently, the membrane requires constant humidification during the operation of the fuel cell, normally by adding water to the reactant gases, usually hydrogen and air.

The proton exchange membrane used in a solid polymer fuel cell acts as the electrolyte as well as a barrier for preventing the mixing of the reactant gases. An example of a suitable membrane is a copolymeric perfluorocarbon material containing basic units of a fluorinated carbon chain and sulphonic acid groups. There may be variations in the molecular configurations of this membrane. Excellent performances are obtained using these membranes if the fuel cells are operated under fully hydrated, essentially water-saturated conditions. As such, the membrane must be continuously humidified, but at the same time the membrane must not be over humidified or flooded as this degrades performances. Furthermore, the temperature of the fuel cell stack must be kept above freezing in order to prevent freezing of the stack.

Cooling, humidification and pressurization requirements increase the cost and complexity of the fuel cell, reducing its commercial appeal as an alternative energy supply in many applications. Accordingly, advances in fuel cell research are enabling fuel cells to operate without reactant conditioning, and under air-breathing, atmospheric conditions while maintaining usable power output.

The current state-of-the-art in fuel cells, although increasingly focusing on simplified air-breathing, atmospheric designs, has not adequately addressed operations in sub-zero temperatures, which requires further complexity of the design. For instance, heat exchangers and thermal insulation are required, as are additional control protocols for startup, shut-down, and reactant humidifiers.

Where a solid polymer proton exchange membrane (PEM) is employed, it is generally disposed between two electrodes formed of porous, electrically conductive material. The electrodes are generally impregnated or coated with a hydrophobic polymer such as polytetrafluoroethylene. A catalyst is provided at each membrane/electrode interface, to catalyze the desired electrochemical reaction, with a finely divided catalyst typically being employed. The membrane electrode assembly is mounted between two electrically conductive plates, each of which has at least one flow passage formed therein. The fluid flow conductive fuel plates are typically formed of graphite. The flow passages direct the fuel and oxidant to the respective electrodes, namely the anode on the fuel side and the cathode on the oxidant side. The electrodes are electrically coupled in an electric circuit, to provide a path for conducting electrons between the electrodes. In a manner that is conventional, electrical switching equipment and the like can be provided in the electric circuit. The fuel commonly used for such fuel cells is hydrogen, or hydrogen rich reformate from other fuels ("reformate" refers to a fuel derived by reforming a hydrocarbon fuel into a gaseous fuel comprising hydrogen and other gases). The oxidant on the cathode side can be provided from a variety of sources. For some applications, it is desirable to provide pure oxygen, in order to make a more compact fuel cell, reduce the size of flow passages, etc. However, it is common to provide air as the oxidant, as this is readily available and does not require any separate or bottled gas supply. Moreover, where space limitations are not an issue, e.g. stationary applications and the like, it is convenient to provide air at atmospheric pressure. In such cases, it is common to simply provide channels through the stack of fuel cells for flow of air as the oxidant, thereby greatly simplifying the overall structure of the fuel cell assembly. Rather than having to provide a separate circuit for oxidant, the fuel cell stack can be arranged simply to provide a vent, and possibly, some fan or the like, to enhance air flow.

There are various applications for which humidification of fuel cells poses particular problems and challenges. For example, operation of fuel cells in mobile vehicles usually means that there is no readily available supply of water for humidifying incoming oxidant and fuel streams. It is usually undesirable to have to provide water to a vehicle for this purpose and also to have to carry the excess weight of the water around in the vehicle. In contrast, for stationary applications, providing a supply of water for humidification is usually quite possible.

However, there also some stationary applications for which humidification is not straightforward. For example, fuel cells are often used to provide power to remote sensing equipment, in locations where water may not be readily available. Additionally, such remote use of fuel cells often occurs at locations with extreme climatic conditions. Thus, it has been known to use fuel cell stacks in the Antarctic regions and the like, for providing supply to scientific instruments. It is simply not realistic to provide a separate supply of water for humidification, because of the problems associated with preventing freezing of the water supply. Additionally, ambient air used as an oxidant is excessively dry, so that humidification is more critical than when using relatively moist air at more moderate temperatures. It will be appreciated that similar extreme conditions can be found in desert locations and the like.

SUMMARY OF THE INVENTION

Accordingly, the present invention is based on the realization that, as a fuel cell inherently produces excess moisture or water as a waste product, this water is available for recycling to humidify incoming flows to the fuel cell.

More particularly, the present inventors have realized that it is advantageous to recover water from the waste or outlet flows from a fuel cell or fuel cell stack, so as to avoid having to provide a separate water source to humidify the oxidant and/or fuel streams.

It has also been recognized that, in extreme climatic conditions, it is desirable, and even in some situations essential, that the humidity of discharged fuel and/or oxidant streams be below certain levels. For example, in extremely cold conditions, if the discharged streams contain significant moisture levels, then this moisture can immediately freeze. In practice, this will form a mist or fog or fine droplets or ice pellets, which would tend to build up on the outside of the apparatus. It will be appreciated that, for a stationary installation intended to supply power to scientific instruments over a long period of time, such a possibility is highly undesirable, and could lead to blockage of vents, undesirable loading due to build-up of ice and other problems. For these reasons, it is desirable that discharged streams contain reduced levels of moisture.

In accordance with a first aspect of the present invention, [there is provided a fuel cell system comprising a fuel cell, a plurality of dryers and a first switch means. The fuel cell has an anode with an anode inlet for receiving a fuel gas and an anode outlet, a cathode with a cathode inlet for receiving an incoming oxidant gas stream and a cathode outlet for discharging an outgoing oxidant gas stream, and an electrolyte between the anode and the cathode. Each dryer in the plurality of dryers has a first mode of operation for recovering moisture from the outgoing oxidant gas stream and a second mode of operation for humidifying the incoming oxidant gas stream, and is connectable to the cathode outlet in the first mode and to the cathode inlet in the second mode. The first switch means is operable to, for each dryer in the plurality of dryers, switch the dryer into and out of the second mode of operation in which the first switch means fluidly connects the dryer to the cathode inlet and obstructs fluid connection between the dryer and the cathode outlet, and to switch the dryer into and out of the first mode of operation in which the first switch means fluidly connects the dryer to the cathode outlet and obstructs fluid connection between the dryer and the cathode inlet. In use, the plurality of dryers includes at least one dryer in the first mode of operation, and at least one dryer in the second mode of operation.

While the invention is applicable to a single fuel cell, it is anticipated that the invention will usually be applied to a plurality of fuel cells configured as a fuel cell stack. In such a case, a cathode inlet and outlet are connected to respective inlet and outlet manifolds connected to each of the fuel cells.

U.S. Pat. No. 6,541,141, issuing from a separate application, Ser. No. 09/592,643, filed simultaneously herewith under the title "Water Recovery in the Anode Side of a Proton Exchange Membrane Fuel Cell" is directed to water recovery on the anode side of a fuel cell. Nonetheless, the present invention envisages that water or moisture recovery could be effected on both the cathode side and the anode side. in this case, the fuel cell is preferably adapted for use with hydrogen as a fuel.

Another aspect of the present invention provides a method of recovering moisture from an outgoing oxidant stream and humidifying an incoming oxidant stream in a fuel cell. In accordance with this second aspect of the present invention, there is provided a method of recovering moisture from an outgoing oxidant stream from a fuel cell and humidifying an incoming oxidant stream for a fuel cell using a plurality of dryers. The fuel cell comprises an anode for receiving fuel and a cathode for receiving the incoming oxidant stream and discharging the outgoing oxidant stream, and an electrolyte between the anode and the cathode. The method comprises the steps of: (i) intermittently switching each dryer in the plurality of dryers into and out of one of a first mode of operation for recovering moisture from the outgoing oxidant stream and a second mode of operation for humidifying the incoming oxidant stream such that during use at least one dryer is in the first mode of operation and at least one dryer is in the second mode of operation; (ii) directing the outgoing oxidant stream from the cathode through at least one dryer in the first mode of operation to recover moisture from the outgoing oxidant stream; and (iii) directing the incoming oxidant stream through at least one dryer in the second mode of operation to humidify the incoming oxidant stream with moisture.

BRIEF DESCRIPTION OF THE DRAWINGS

For a better understanding of the present invention and to show more clearly how it may be carried into effect, reference will now be made, by way of example, to the accompanying drawings which show preferred embodiments of the present invention and in which:

FIG. 4b, in a perspective view, shows the housing of the switch means of FIG. 4a;

FIG. 5b, in a sectional view, shows the rotary member of FIG. 5a;

FIG. 5c, in a cut away perspective view, illustrates the rotary member of FIG. 5a;

FIG. 5d, in a perspective view, orthogonal to the perspective view of FIG. 5a, shows the rotary member of FIG. 5a;

DETAILED DESCRIPTION OF THE INVENTION

Figure 1:
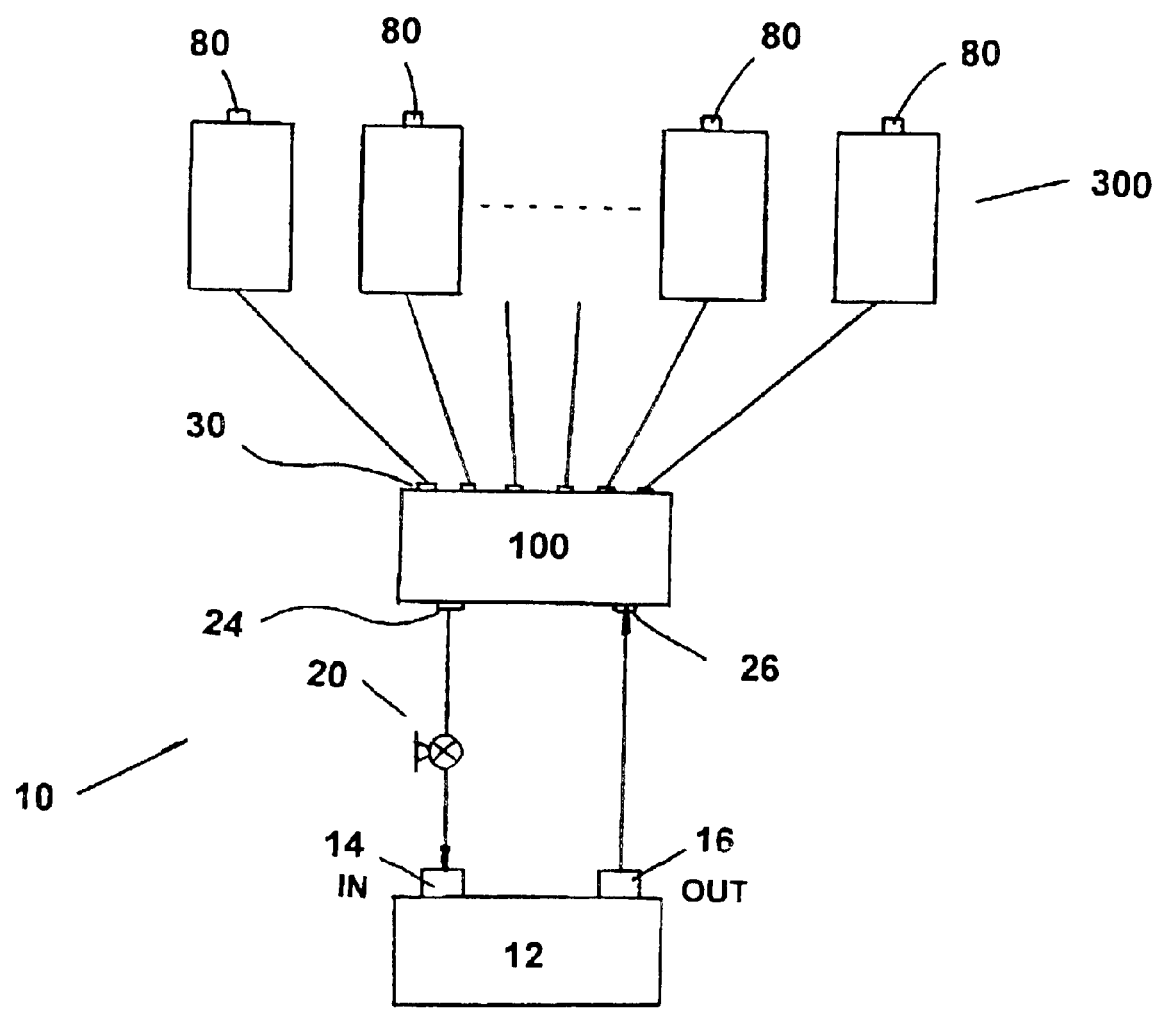
FIG. 1 is a schematic view of a first embodiment of a regenerative dryer device for recovering and recycling water on the cathode side of a fuel cell stack.

Referring first to FIG. 1, there is illustrated in a schematic view, a regenerative dryer device 10 in accordance with the first embodiment of the invention. The regenerative dryer device 10 includes a fuel cell stack 12, although it will be appreciated that the fuel cell stack 12 could comprise just a single fuel cell. In known manner, the fuel cell stack has inlets and outlets for both fuel and an oxidant. In FIG. 1, an inlet 14 and an outlet 16 are shown for the oxidant. Commonly, the oxidant is air, although for certain applications it can be pure oxygen.

A first switch means 100 is provided having a first inlet port 24 fluidly connected to the inlet 14 and a first outlet port 26 fluidly connected to the outlet 16 of the fuel cell stack 12, to introduce incoming oxidant gas stream into the fuel cell stack 12 while simultaneously discharging outgoing oxidant gas stream from the fuel cell stack 12 without mixing the two streams. A plurality of dryers 300 are provided. Each dryer 300 is fluidly connected to each of a plurality of first dryer ports 30 of the first switch means 100 and has an external port 80 for taking in or exhausting gas. A pump 20 is disposed between the first switch means 100 and the inlet 14 for supplying oxidant gas stream from the switch means 100 to the fuel cell stack 12.

The first switch means 100 operates in a manner detailed below. Generally, at any given time during operation, the first switch means 100 provides fluid communication between the inlet 14 and some of the plurality of dryers 300, while simultaneously permitting fluid communication between the outlet 16 and the others of the plurality of dryers 300, respectively. Hereinafter, the dryers fluidly connected to the inlet 14 are referred to as working in intake mode while the dryers fluidly connected to the outlet 16 are referred to as working in exhaust mode. The individual dryers working in each mode change with time.

In more detail, at a given time, a first plurality of dryers 300 working in the intake mode are connected to the inlet 14 of the fuel cell stack 12 via the first switch means 100. Consequently, the pump 20 draws the oxidant, such as ambient air, through the external ports 80 of the first plurality of dryers 300 into the dryers 300. At least one of the first plurality of dryers 300 will previously have been, in exhaust mode, charged with moisture from the outgoing oxidant stream, so that incoming air picks up moisture and is humidified during passage through the at least one dryer 300. The humidified air then passes through the first switch means 100 and through the pump 20 to the stack oxidant inlet 14. Simultaneously, a second plurality of dryers 300 working in the exhaust mode are connected to the outlet 16 of the fuel cell stack 12 via the first switch means 100. Consequently, warm and humidified air discharged from the oxidant outlet 16 passes through the second plurality of dryers 300. At least one of the second plurality of other dryers 300 will previously have been, in intake mode, dehumidified by the incoming, relatively dry air. The passage of the outgoing air through the at least one other dryer dries and dehumidifies the outgoing air, and simultaneously charges the at least one other dryer 300 with moisture.

After a predetermined time period, determined by the capacities of the dryers 300, as well as the pressure and flow rate of incoming air and outgoing air, the switch means 100 switches so that the operation of at least one of the dryers switches from intake mode to exhaust mode. Thus, the said at least one dryer, which will have given up retained moisture while operating in intake mode, then has moist outgoing air from the outlet 16 passed through, to recharge said at least one dryer with moisture. Likewise, simultaneously, at least one of the other dryers previously operated in exhaust mode now operates in intake mode. Thus, incoming air passes through the said at least one other dryer to pick up moisture and dehumidifies the said at least one other dryer.

The switch of operation mode is repeated for different dryers as time goes on, so that during prolonged operation of the fuel cell stack 12, each of the plurality of dryers 300 will eventually have operated in both modes. This causes two main effects. Firstly, this ensures that the incoming air stream is humidified at a reasonably constant level. Correspondingly, the exhausted air stream is dehumidified. This is of particular advantage in cold climates. It ensures that moisture in air discharged from the external ports 80 of the dryers will not tend to immediately form frost or ice, which, over a period of time, can tend to build up and possibly block the ports in the apparatus.

It can be appreciated that the first switch means 100 serves to select dryers that are to switch their operation modes. This selection can be made randomly or sequentially. Sequential selection is preferred since it allows every dryer equal chance to switch between two operation modes and avoids duplicate selection for any single dryer. Particularly, the sequential selection can be simply made by sequentially switching a first dryer port 30 from being connected to one of the first inlet port 24 and first outlet port 26 to the other of the first inlet port 24 and first outlet port 26. Therefore, during each switch operation, one dryer switches from intake mode to exhaust mode while simultaneously another dryer switches from exhaust mode to intake mode. However, during each switch operation, more than one dryer can switch from intake mode to exhaust mode. Likewise, more than one dryer can switch from exhaust mode to intake mode. It can also be appreciated that the number of dryers switching from intake mode to exhaust mode may or may not be the same as that of the dryers switching from exhaust mode to intake mode.

Hence, "sequential selection" should be construed as selection in a certain manner. It is not limited to switching operation mode of dryers according to their physical position. That is to say, physically adjacent dryers may, but need not switch operation mode one after another.

Figure 2:
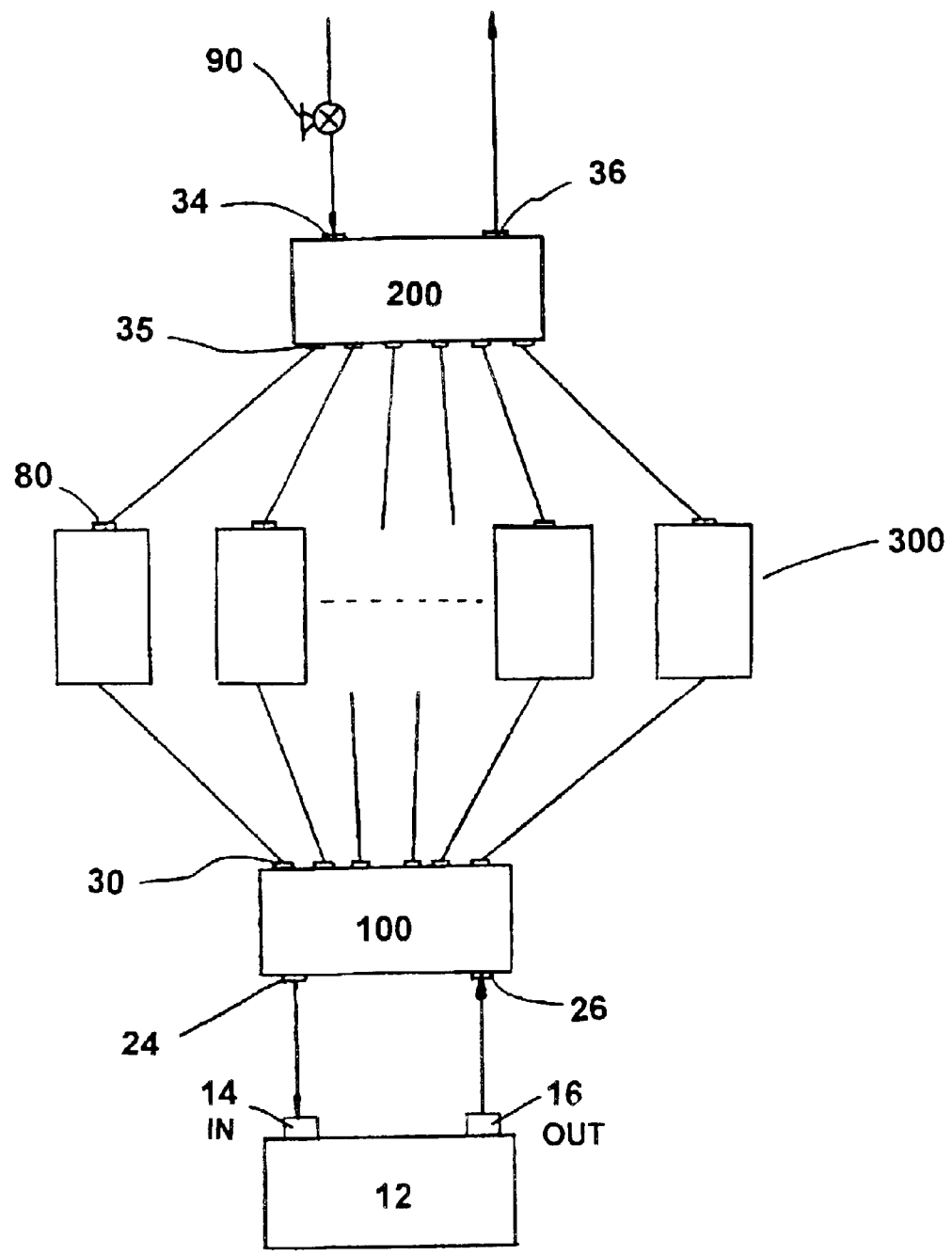
FIG. 2 is a schematic view of a second embodiment of a regenerative dryer device for recovering and recycling water on the cathode side of a fuel cell stack.

Referring to FIG. 2, this shows a second embodiment of the apparatus. In this second embodiment, many components are similar to the first embodiment, and for simplicity and brevity, a description of these components is not repeated. Rather, these components are given the same reference numerals, and it will be understood that they function in the same manner as for the first embodiment.

The sole additional element in this second embodiment is the provision of a second switch means 200. The second switch means 200 has a second inlet port 34 connected to an external oxidant source, a second outlet port 36 for discharging oxidant exhaust and a plurality of second dryer ports 35 respectively connected to the external ports 80 of the plurality of dryers 300. A pump or compressor 90 is provided for supplying oxidant from the external source into the second inlet port 36. In this embodiment, the overall apparatus has only one inlet 34 and one outlet 36 interfacing with the environment. This provides better sealing and control of oxidant flow.

In the same manner as described in the first embodiment of the present invention, the first switch means 100 determines, at any given time, whether a dryer 300 is connected to the inlet 14 or the outlet 16 of the fuel cell stack 12. In a similar manner, the second switch means 200 determines, at any given time, whether a dryer 300 is connected to the inlet 34 or the outlet 36. In order to ensure proper operation, the switch operation of the first switch means 100 has to be in phase with that of the second switch means 200. In other words, the first and second switch means 100 and 200 should be synchronized so that when a dryer 300 is in fluid communication with the inlet 14 via the first switch means 100, the second switch means 200 provides fluid communication between this dryer 300 and the second inlet port 34. Meanwhile, for any dryer 300 in fluid communication with the outlet 16 via the first switch means 100, the second switch means 200 permits fluid communication between said dryer and the second outlet port 36.

As mentioned above, the switch operation can be done sequentially or randomly. The switch means 100 and 200 may be a multi-way valve means. The plurality of dryers 300 may be disposed individually or adjacent to one another. Depending on the configuration of the switch means 100, 200 and the dryers 300, the switch operation can be done "continuously" or gradually, as will be detailed below.

Figure 3:
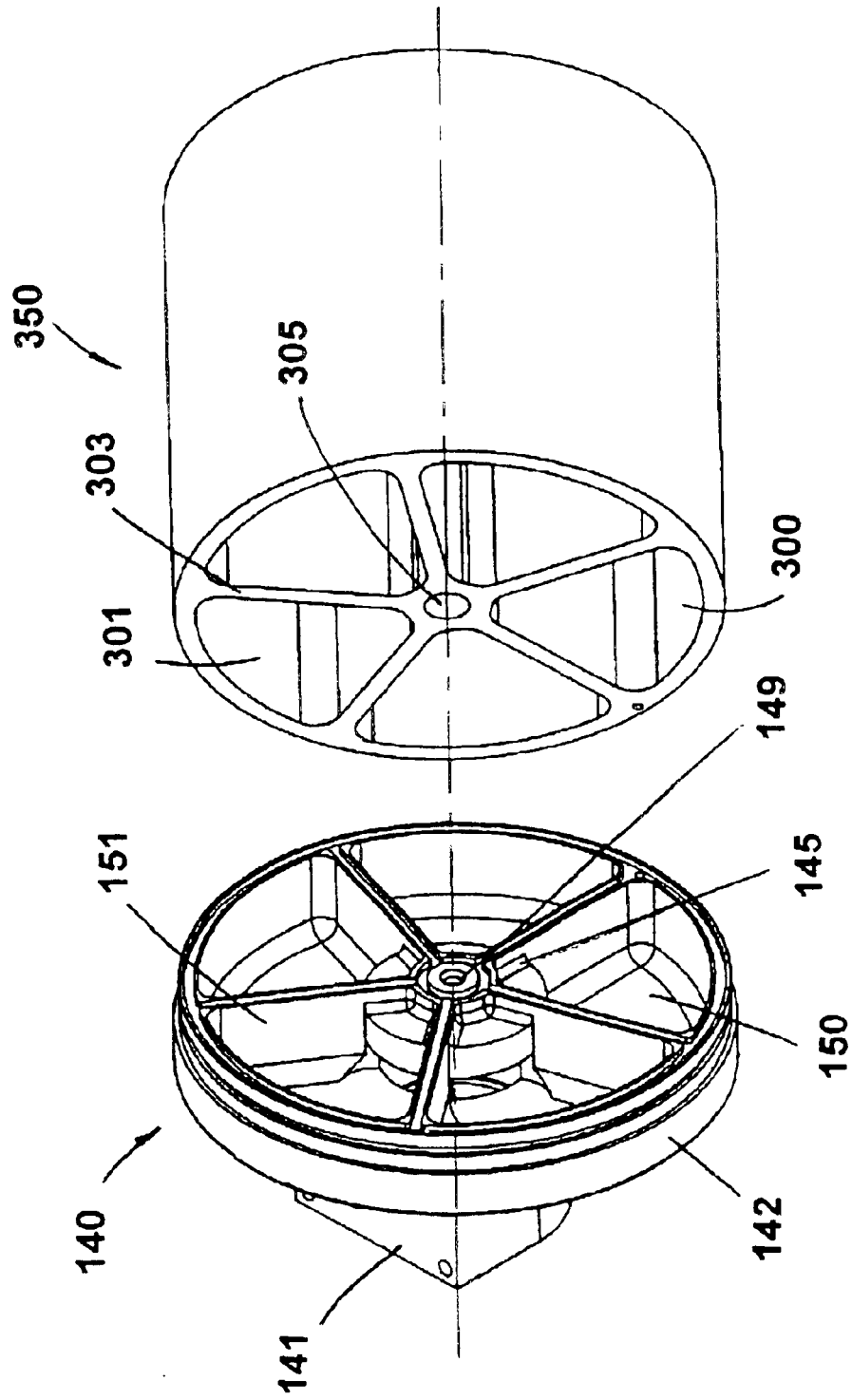
FIG. 3, in a perspective view, shows dryers and switch means of a regenerative dryer device for recovering and recycling water on the cathode side of a fuel cell stack in accordance with a third embodiment of the invention.

Reference will now be made to FIGS. 3–7, which show embodiments of dryers and switch means. As shown in FIG. 3, a plurality of dryers 300 are contained in a dryer housing 350 comprising multiple chambers 301. For illustration only, the dryer housing 350 comprises five chambers 301. It will be appreciated that the dryer housing 350 may comprise any number of chambers. Each chamber 301 is separated by partition walls 303 from adjacent chambers 301, and filled with the humidity exchange media (not shown). Suitable exchange media comprises random oriented fiber based carbon paper, commercially available from E-TEK, or carbon cloth commercially available from W. L. Gore. The media can be coated with a desiccant material. When a humid gas stream passes through the chamber, humidity is retained in the media and later picked up by a dry gas stream flowing through the media. Hence, each chamber filled with exchange media operates as a dryer mentioned above.

An end housing 140 is adapted to be mounted onto one end of the dryer housing 350. The end housing 140 has a connection portion 141 and a dispersion portion 142. The dispersion portion 142 of the end housing 140 has a plurality of compartments 150, e.g. five compartments in this example, divided by partition walls 151. The number and position of compartments 150 correspond to that of the chambers 301. In other words, the compartments 150 and the chambers 301 are in alignment during operation.

Figure 4B:
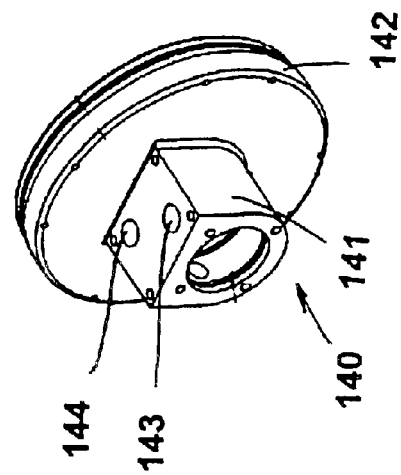
Figure 4A:
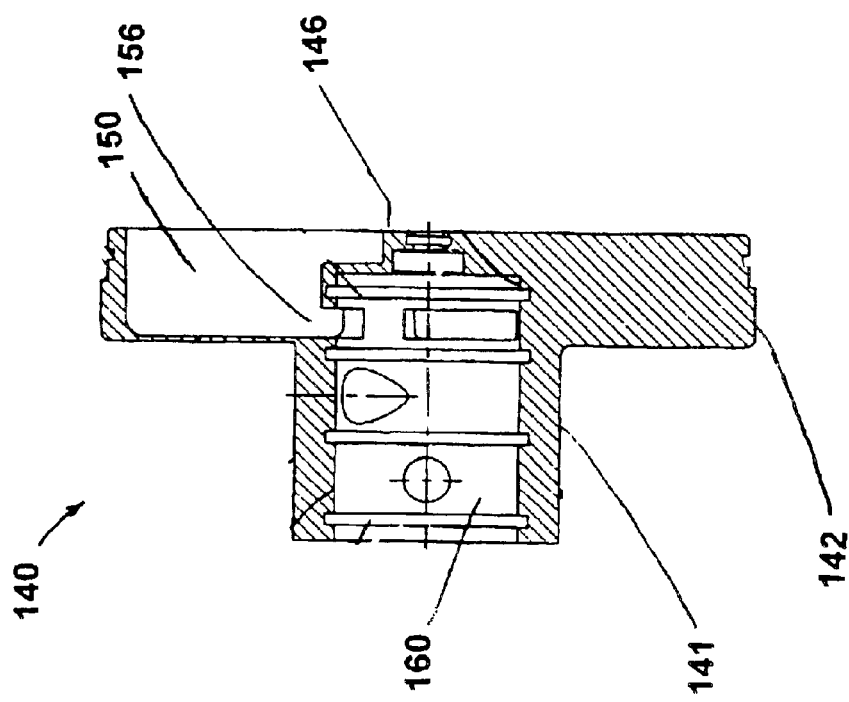
FIG. 4a, in a sectional view, shows a housing of a switch means of the regenerative dryer device of FIG. 3.
Figure 5A:
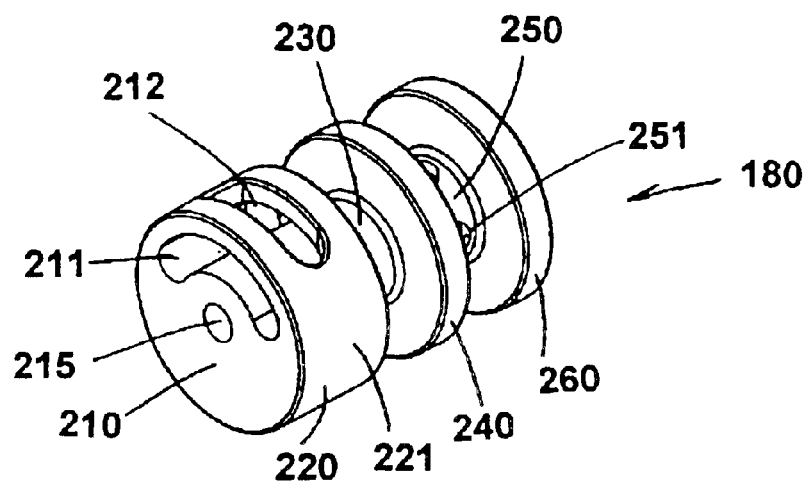
FIG. 5a, in a perspective view, shows a rotary member of the switch means of the regenerative dryer device of FIG. 3.
Figure 5B:
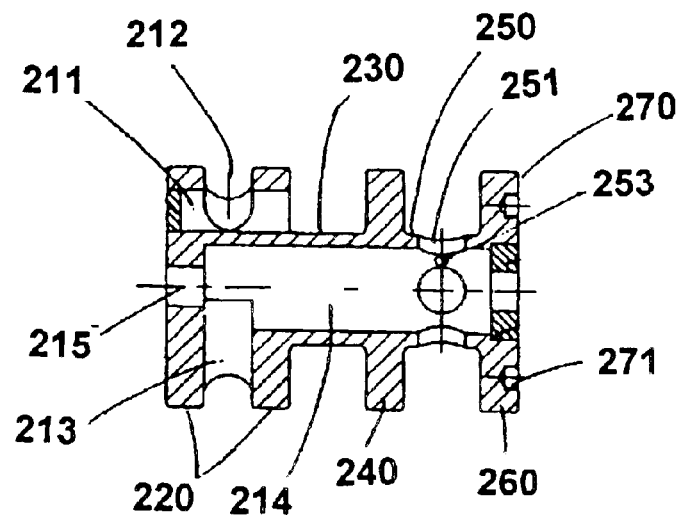
Figure 5C:
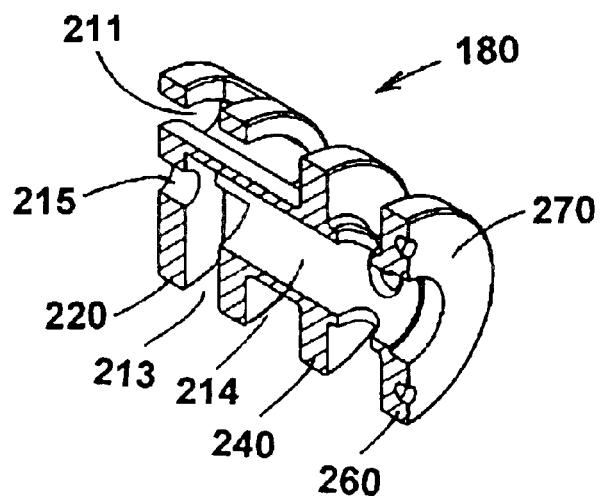
Figure 5D:
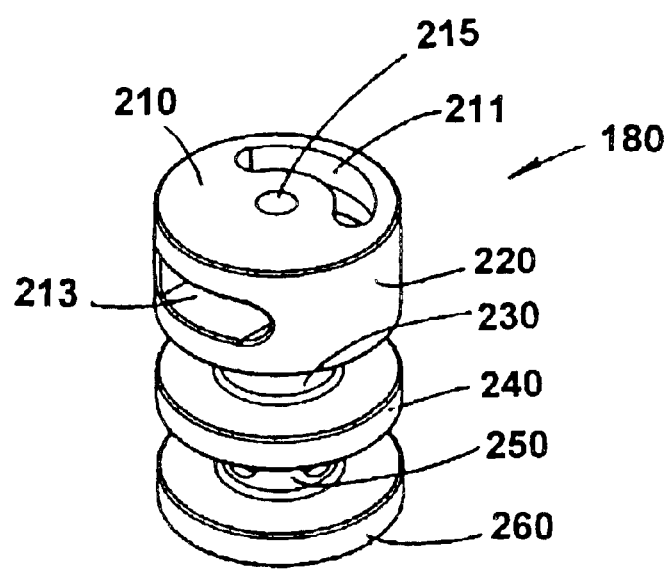

FIGS. 4 and 5 respectively show details of the end housing 140 and a rotary member 180 disposed therein. Referring to FIGS. 4a and 4b, the connection portion 141 of the end housing 140 has a chamber 160 for accommodating the rotary member 180, and an associated open end. The connection portion 141 has a smaller diameter than the dispersion portion 142. A journal 145 is provided at the center of the open end of the dispersion portion 142. The journal 145 has an enlarged diameter portion 146. Each compartment 150 has an opening 156 that is provided on the enlarged diameter portion 146 and fluidly communicates the chamber 160 with each compartment 150, respectively.

FIGS. 5a–5d show the detailed structure of the rotary member 180. The rotary member 180 has a plurality of reduced diameter portions. Specifically, in this example, the rotary member 180 has a first segment 220, a second segment 240, and a third segment 260, as well as a first reduced diameter portion 230 and a second reduced diameter portion 250. The segments 220, 240 and 260 can have the same diameter. Likewise, the reduced diameter portions 230, 250 can have the same reduced diameter. Within an end surface 210 of the rotary member 180, a slot 211 is provided. Preferably, slot 211 is arc shaped, and has a smaller radius of curvature than the end surface 210 of the first segment 220. The slot 211 extends axially throughout the first segment 220. On the outer wall 221 of the first segment 220 two slots can be provided, namely slots 212 and 213. Slot 211 is in fluid communication with slot 212.

The rotary member 180 has an inner bore 214 extending axially throughout the length thereof. The inner bore 214 extends to a position adjacent to the end surface 210, at which point it has a reduced diameter portion 215 for supporting a shaft 190 (FIG. 6) that extends therethrough after assembly. The inner bore 214 is isolated from slots 211 and 212. Slot 213 is in fluid communication with inner bore 214.

The second reduced diameter portion 250 is provided with a plurality of holes that penetrate this portion, namely, a plurality of gas dispersion holes 251 and pinholes 253. In a known manner, at least one of the pinholes 253 can be used to accommodate a pin (not shown) to fix the rotary member 180 to the shaft 190 so that the rotary member 180 rotates with the shaft 190 to disperse the gas streams, as will hereinafter be described.

On an end surface 270 of the third segment 260, a number of screw holes 271 are provided. These screw holes 271 are used to accommodate screws to enable the rotary member 180 to be removed from the end housing 140 during disassembly.

Figure 6:
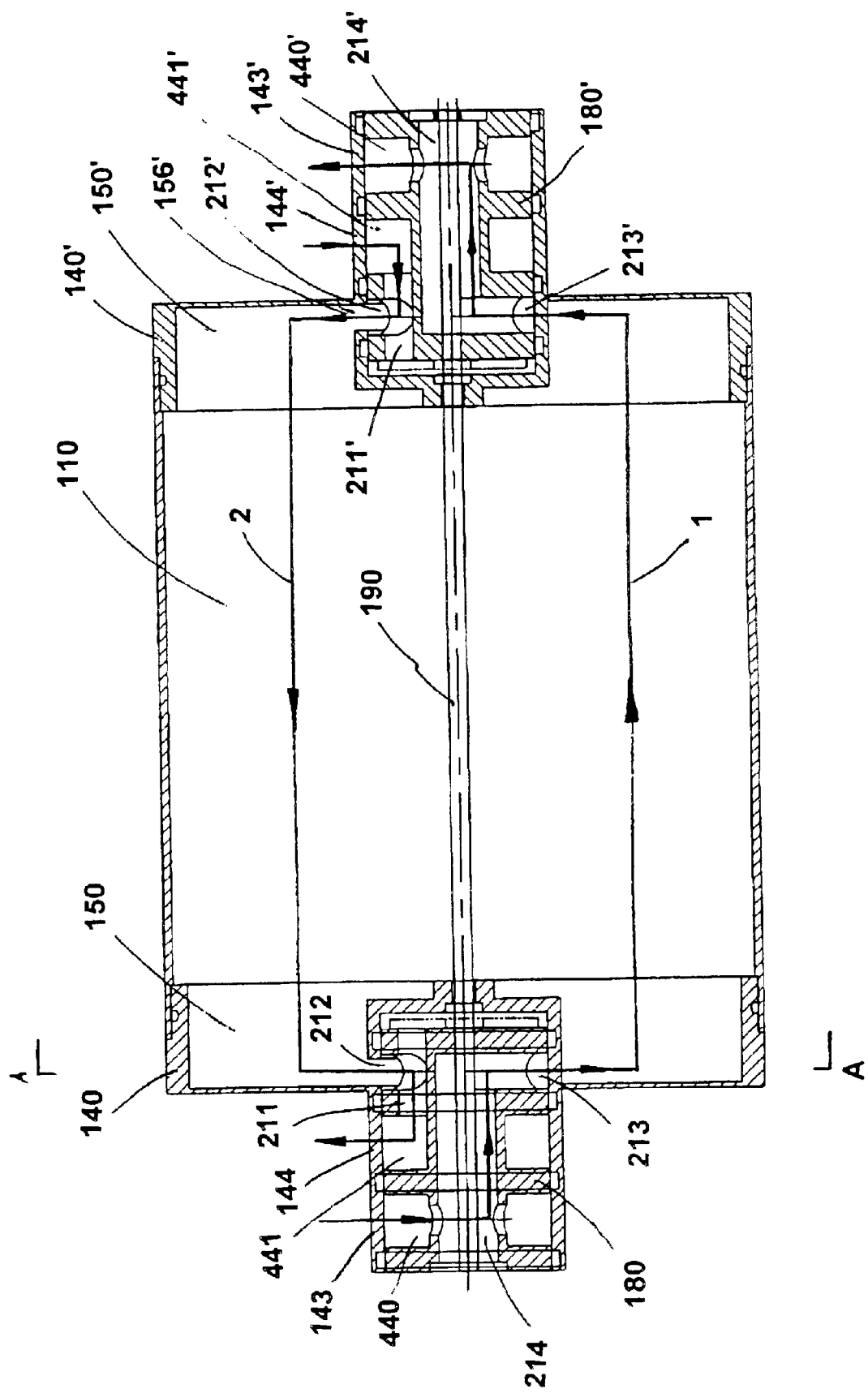
FIG. 6, in a sectional view, shows a further embodiment of a regenerative dryer device for recovering water on the cathode side of a fuel cell stack, incorporating the components of FIGS. 3–5.

As can be seen in FIG. 3, the journal 145 of the end housing 140 has a hub 149 used to accommodate the shaft 190. A central bore 305 is also provided on the dryer housing 350 to accommodate the shaft 190. Therefore, it can be appreciated that during operation, a shaft 190 can pass through the central bore 305, hub 149 and inner bore 214 to support the dryer housing 350, end housing 140and the rotary member 180 respectively. However, only the rotary member 180 rotates with the shaft 190 while the end housing 140 and dryer housing 350 remain stationary. The rotary member 180 and the end housing 140 together operate as the first switch means 100 in a manner detailed below. Another end housing 140' with a rotary members 180' disposed within its chamber can be mounted onto the other end of the dryer housing 350 to operate as another switch means 200, as shown in FIG. 6. As can been seen in FIG. 6, the shaft 190 also passes through the inner bore 214' of the rotary member 180'. Likewise, the rotary member 180' is also fixed to the shaft 190 in the above-described manner and rotates with the shaft 190.

The end housing 140 and the rotary member 180 are dimensioned such that each of the slots 212, 213 of the first segment 220 of the rotary member 180 are substantially aligned with each of a plurality of openings 156 (FIG. 4a) of the plurality of compartments 150 for dispersing gases when the rotary member 180 is disposed in the end housing 140. Furthermore, at least the segment 240 of the rotary member 180 has substantially the same diameter as that of the chamber 160 of the end housing 140 such that segment 240 separates the chamber 160 into two inner spaces 440 and 441 when disposed therein. The other end housing 140' and the other rotary member 180 are also dimensioned accordingly.

In known manner, sealing means, such as O-rings can be provided between the rotary member, specifically, the first segment 220, second segment 240, and third segment 260 and the inner wall of the chamber 160. The open ends of the end housings 140, 140' are then closed. As mentioned above, the connection portion 141 has a smaller diameter than the dispersion portion 142. This configuration is preferred since it reduces size of dynamic sealing, and hence the risk of leakage, between rotary members 180, 180' and respective end housings 140, 140'.

As shown in FIG. 6, during operation, an incoming oxidant stream 1 enters the apparatus from one side thereof through a gas port 143, and flows into the inner space 440. From here, the incoming oxidant 1 flows through the plurality of gas dispersion holes 251 located on the second reduced diameter portion 250, into the inner bore 214. Next, the incoming oxidant 1 flows along the length of the inner bore 214, and exits the rotary member 180 through slot 213. As the rotary member 180 is continuously rotating with the shaft 190, the incoming oxidant 1 flows into one of the compartments 150 via a respective opening 156 when the rotary member 180 rotates into a position where slot 213 fluidly communicates with one of the openings 156. As the incoming oxidant 1 is usually conveyed by a blower or compressor (not shown), the incoming oxidant 1 is forced to flow along the axial direction into the media 110 supported in at least one chamber 301 of the dryer housing 350. Then, the incoming oxidant 1 continues to flow into the corresponding compartment 150' of the other end housing 140'. From here, the incoming oxidant 1 flows through opening 156' (not shown, but analogous to opening 156) and slot 213' respectively, and enters the inner bore 214' of the other rotary member 180'. Next, the incoming oxidant 1 flows along the length of the inner bore 214', exits through the plurality of holes 251' (not shown, but analogous to holes 251), passes through the inner space 440', exits the apparatus through a gas port 143', and passes into inlet 14 of the fuel cell stack 12. As the incoming oxidant 1 flows across the media 110, it picks up the heat and humidity retained in the media 110. Since the rotary member 180 continually rotates with the shaft 190, the incoming oxidant 1 flows through the whole cross section of the media 110 to pick up humidity from the media 110.

An outgoing oxidant stream 2 enters the apparatus through a gas port 144' of the end housing 140' from the outlet 16 of the fuel cell stack 12, and flows into the inner space 441'. From here, the outgoing oxidant 2 passes through slots 211' and 212', respectively. The outgoing oxidant 2 then flows into one of compartments 150' via a respective opening 156' when the rotary member 180' rotates into a position where slot 212' fluidly communicates with one of the openings 156'. Next, the outgoing oxidant 2 flows through the media 110 supported in at least one chamber 301 of the dryer housing 350 to a corresponding chamber 150 of the end housing 140. As the outgoing oxidant 2 flows along the media 110, heat and humidity is retained in the media 110. From here, the outgoing oxidant 2 flows through opening 156, slots 212 and 211 respectively, and enters the inner space 441 of the end housing 140. Next, the outgoing oxidant 2 exits the apparatus through a gas port 144 (FIG. 4b). Likewise, since the rotary member 180' continually rotates with the shaft 190, the outgoing oxidant 2 flows through the whole cross section of the media 110 to transfer humidity to the media 110.

As mentioned above, in order to ensure proper operation, the rotary members 180 and 180' have to rotate in phase. It can be done by mounting the rotary members 180 and 180' correspondingly on the shaft 190 since the two rotary members will then rotate together with the shaft 190.

Figure 7:
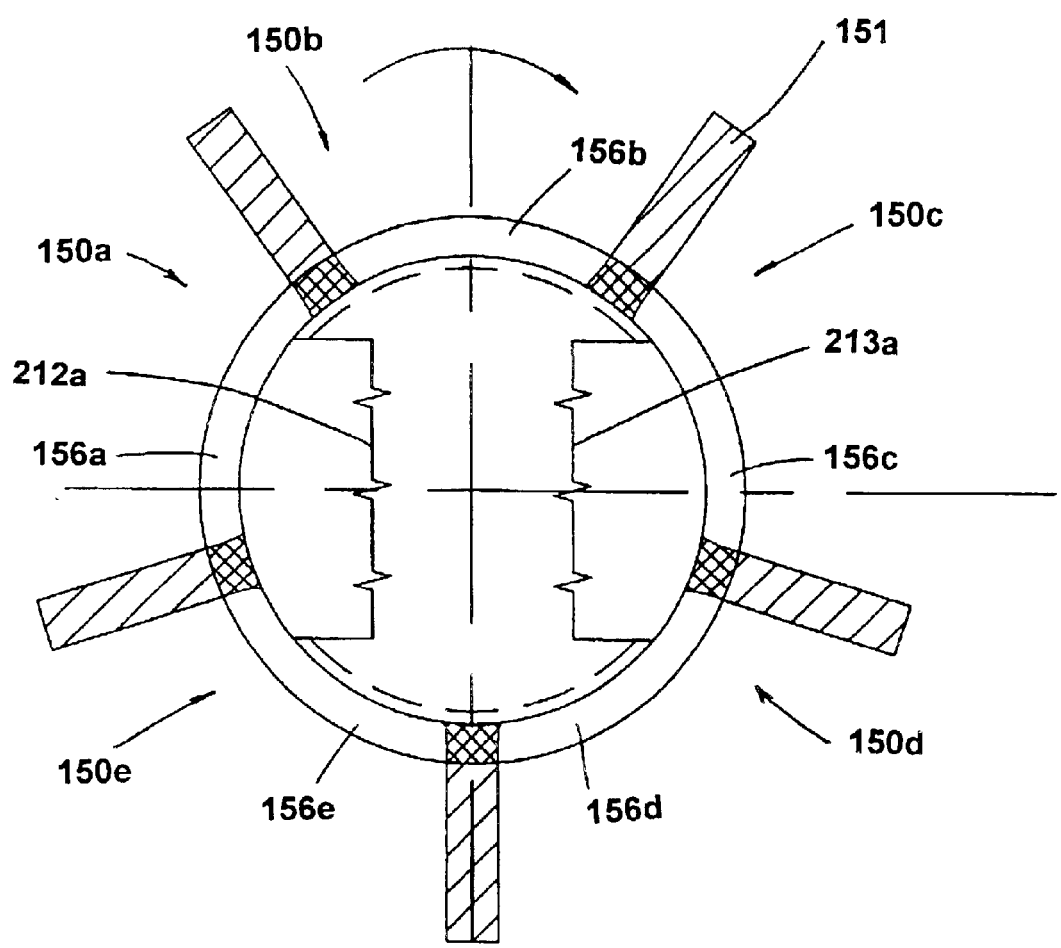
FIG. 7, in a cross-sectional view taken along line A—A of FIG. 6, illustrates the relationship between the size of slots in the rotary and the openings of the chambers in the end housing.

FIG. 7 shows the relationship between the size of the slots 212, 213 and the openings 156, in case of five compartments 150. In this Figure, segment 212a and 213a respectively indicates a cord corresponding to the arc shaped slots 212 and 213. Therefore, the two ends of each segment 212a, 213a represent the two ends of each slot 212, 213, respectively. As illustrated in FIG. 7, the rotary member 180 is rotating in a clockwise direction. The slots 212, 213 and the openings 156 should be sized such that at the moment the slot 213 leaves a compartment, the slot 212 does not communicate with the same compartment. In the case of compartment 150b when the fluid communication between the slot 213 and the opening 156b is cut off, the slot 212 does not fluidly communicate with the same opening 156b. Similarly, when the fluid communication between the slot 212 and opening 156d is cut off, the slot 214 does not fluidly communicate with the opening 156d. In other words, at any time, any one of compartment 150, chamber 301, and compartment 150', will only contain either one of the incoming or outgoing oxidant streams. The partition walls 151 separate each compartment so that the incoming and outgoing oxidant streams will never mix. To ensure no mixing of the gas streams, the size of the slots 212, 213 of the rotary member 180 and the size of the openings 156 are selected depending on the actual number of chambers 301 and compartment 150.

As will be appreciated from the above description, by continuous rotating of the shaft 190, and hence the rotary members 180 and 180', the switch operation of the first and second switch means 100 and 200 can be done "gradually". It will also be appreciated that at any give time, it is possible that not all the dryers are working, i.e. having an oxidant stream flowing therethrough. For example, at the moment shown in FIG. 7, compartment 150*b*, and hence the corresponding chamber, does not have any oxidant stream. It is considered to be in a neutral position. However, although not preferred, the slots 212, 213 can also be suitably sized so that such neutral positions do not exist.

It is to be understood that although in the above example, the dryer housing 350, the connection portion 142, 142' and dispersion portion 143, 143' of the end housing 140, 140', and the first, second and third segments 220, 240, 260 are all described as cylindrical in shape, the actual shape may vary as will be required in particular situations. They may also have different perimetrical extents at different axial positions. Therefore, the words "diameter" and "radial" should not be understood to restrict to cylindrical shape.

Figure 9:
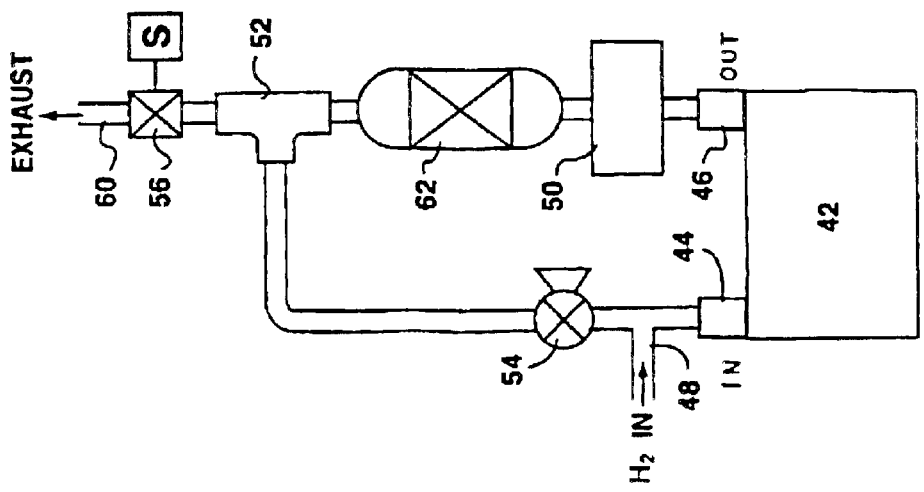
FIG. 9, in a schematic view, illustrates a further embodiment of an apparatus for recovering and recycling water on the anode side of a fuel cell stack.
Figure 8:
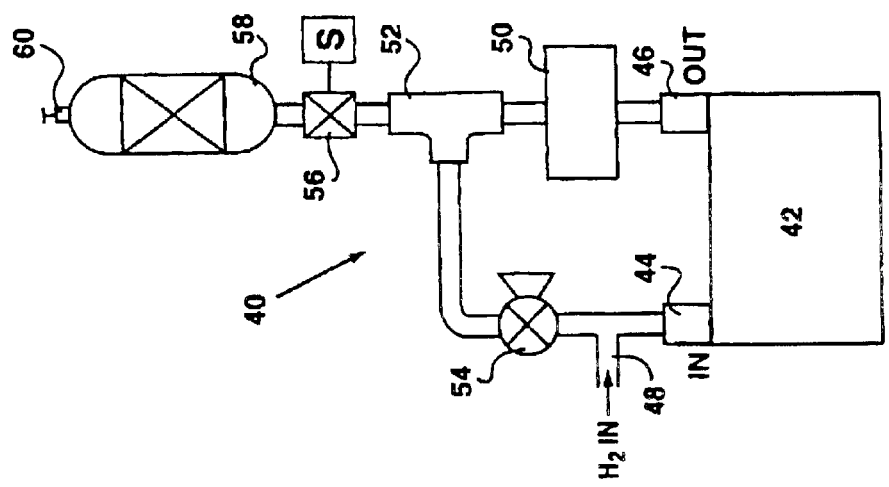
FIG. 8, in a schematic view, illustrates an apparatus for recovering and recycling water on the anode side of a fuel cell stack in accordance with a further embodiment of the invention.
Figure 10:
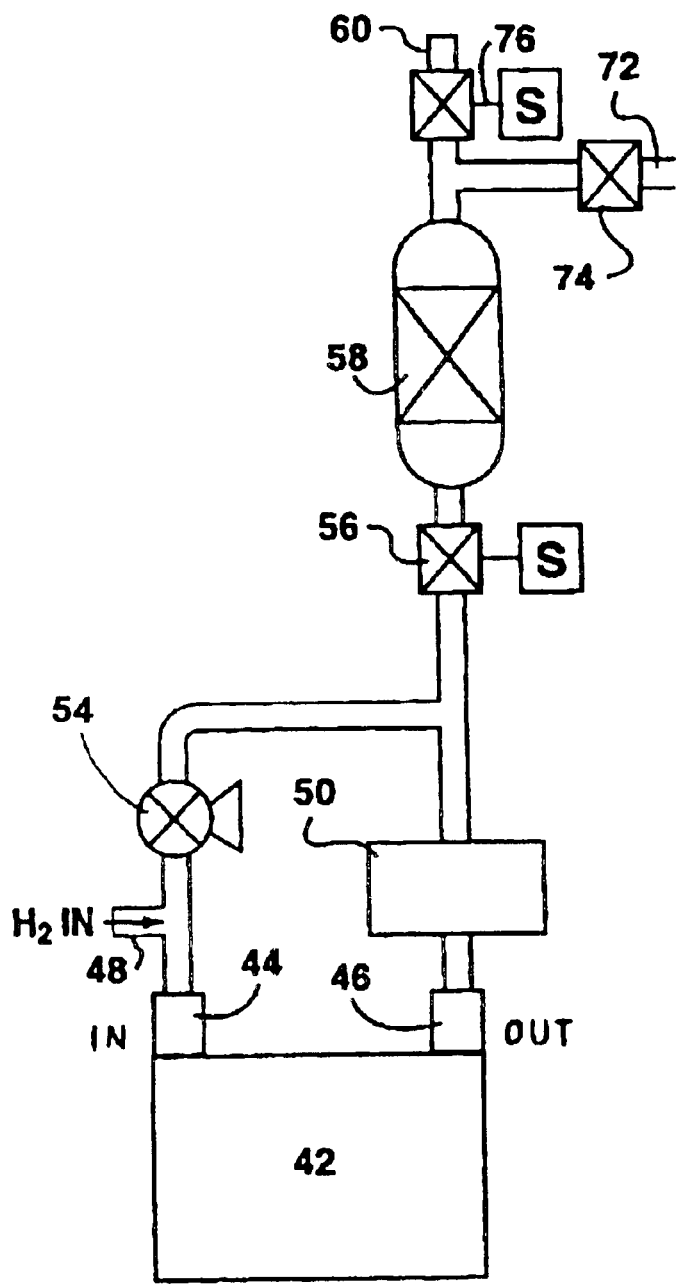
FIG. 10, in a schematic view, illustrates a further embodiment of an apparatus for recovering and recycling water on the anode side of a fuel cell stack.

Reference will now be made to FIGS. 8, 9 and 10, which show three separate embodiments of an apparatus for effecting drying of the fuel stream in a fuel cell stack. In particular, this technique is particularly intended for a fuel stream comprising hydrogen, although it will be recognized by those skilled in the art that this technique has applicability to a wide range of other fuels. An example of another fuel is a hydrogen rich reformate fuel, i.e. a fuel produced by reforming a hydrocarbon fuel, to produce a gas mixture rich in hydrogen.

Referring to FIG. 8, a first embodiment of the apparatus for drying the anode flow is indicated generally by the reference 40. It again includes a fuel cell stack indicated generally at 42, and a fuel inlet 44 and a fuel outlet 46 are provided. A main hydrogen or fuel inlet 48 is provided immediately upstream from the stack fuel inlet 44.

The outlet 46 is connected to a water separator 50 and then to a T-connector 52. One branch of the T-connector 52 is connected through a pump 54 back to the fuel inlet 44.

The other branch of the T-connector 52 is connected through a shut-off valve 56 and then through a dryer 58 to a vent port 60.

In a normal mode of operation, the shut-off valve 56 is closed, and the pump 54 actuated to cycle hydrogen through the stack 42.

As is known, a common problem with fuel cells is that nitrogen tends to diffuse across the membrane from the cathode side to the anode side and consequently, after a period of time, nitrogen tends to build up on the anode or hydrogen side of the stack. Additionally, there can be a problem with build-up and moisture on the membrane.

For these two reasons, periodically, for example every 5 minutes, the anode side can be purged. For this purpose, a shut-off valve 56 is opened for a short period, for example 5 seconds, to vent gas through the dryer 58 to the vent port 60. Typically, the anode side is operated at a slight positive pressure. Opening the valve 56 causes the pressure pulse to pass through the stack, which can have the effect of causing the water to "jump out of" pores of the electrodes and gas diffusion media. In any event, whatever the exact mechanism, it has been found that an abrupt and sharp purge cycle tends to promote venting of excess moisture, in addition to built up and unwanted gases.

At the end of the 5 second purge cycle, the valve 56 is closed again.

The dryer 58 serves to ensure that gas vented through the vent port 60 has a low level of humidity. This can be desirable in certain circumstances. In particular, in cold climates, this ensures that there is no problem with moisture and the vented gas tending to form frost and ice particles and build up on or around the apparatus.

The dryer 58 can be replaced at suitable intervals, e.g. when replacing the fuel that supplies the hydrogen, where hydrogen is supplied from a cylinder. Alternatively, it may be possible to provide some variant configuration in which incoming fuel is passed through the dryer 58 to pick up moisture accumulated therein.

In FIGS. 9 and 10, components common to FIG. 9 are given the same reference numerals. For the reasons given above, a description of these components is not repeated, for simplicity and brevity.

Thus, in FIG. 9, a dryer 62 is provided between the separator 50 and the T-connector 52. The shut-off valve 56 is then provided immediately above the T-connector 52 as before, but here is connected directly to a vent port 60.

FIG. 9 functions, in use, in effect, to maintain a desired humidity level within the anode side of the fuel cell stack 42. Thus, excess moisture can be separated in the separator 50, but it is anticipated that the dryer 62 will run in an essentially saturated condition, so as to maintain humidity at a desired level.

Again, as for FIG. 9, the shut-off valve 56 can be opened periodically, e.g. every 5 minutes for purge cycle of, for example, 5 seconds. This again prevents build up of nitrogen in the anode side of the stack. To the extent that water is removed from the fuel cell from the purge cycle, this water would be either separated by the separator 50, in the case of water droplets, or otherwise absorbed by the dryer 62.

To the extent that dryer 62 is used to maintain a constant humidity level, it should not be necessary to exchange the dryer at any time. However, it may be desirable to replace the dryer from time to time, as contaminants may tend to build up in the dryer 62.

Finally, with reference to FIG. 10, the third embodiment of the anode aspect of the invention includes all the elements of FIG. 9. It additionally includes a second hydrogen inlet 72, a hydrogen control valve 74 and a second shut-off valve 76.

In normal use, this third embodiment functions in much the same manner as the first embodiment of FIG. 8. Thus, hydrogen is usually supplied through the main fuel inlet 48. The pump 54 is run to cycle hydrogen continuously through the separator 50.

Theoretically, again for example every 5 minutes, a short purge cycle (again, for example 5 seconds) can be effected by opening the shut-off valve 56. Simultaneously, the second shut-off valve 76 is opened. This again permits gas to vent from the anode side of the stack through the dryer 58 to the vent port 60.

Now, when moisture builds up in the dryer 58, periodically the supplied hydrogen is switched from the main fuel inlet 48 to the second hydrogen inlet 72. For this purpose, a valve (not shown) will be closed to close off the main fuel inlet 48. Simultaneously, the hydrogen control valve 74 would be opened. The second shut-off valve 76 would remain closed and the first shut-off valve 56 opened. This permits supply of hydrogen from the second hydrogen inlet 72 through the dryer 58 towards the anode side of the stack 42.

The pump 54 would be run as before. Consequently, hydrogen will be cycled through the stack and the water separator 50. As hydrogen is consumed, fresh hydrogen will be supplied from the inlet 72, and this hydrogen would be humidified in the dryer 58 thereby serving to remove moisture from the dryer 58 and recharge the dryer.

After a suitable period of time, the hydrogen control valve 74 will be closed and hydrogen supply would be recommenced through the main hydrogen or fuel inlet 48. The dryer 58 would then be in a dried or recharge condition, ready to recover moisture from gas during the purge cycle.

The advantage of this embodiment, as compared to that of FIG. 9, is that it recovers moisture and uses it to add humidity to incoming hydrogen. At the same time, it does not require replacement of the dryer, to effect recharging of the dryer.

Where humidification is provided just on the cathode side, it is recognized that, in use, water is generated primarily on the cathode side, due to proton migration through the membrane. For this reason, water recovery from the cathode side can be optimal. Nonetheless, depending on the operating conditions, significant moisture can be generated or occur on the anode side. For example, if the oxidant side is maintained at a significantly higher pressure than the anode or fuel side, then water generated during reaction can be caused to flow back through the membrane, so that a significant quantity of water appears on the anode side and so that the exhausted anode fuel stream is significantly humidified. In such cases, recovering or controlling moisture in the exhausted fuel stream is desirable.

What is claimed is:

1. A fuel cell system comprising:
   (a) a fuel cell having
      an anode with an anode inlet for receiving a fuel gas and an anode outlet,
      a cathode with a cathode inlet for receiving an incoming oxidant gas stream and a cathode outlet for discharging an outgoing oxidant gas stream, and
      an electrolyte between the anode and the cathode;
   (b) a plurality of dryers, each dryer in the plurality of dryers
      having a first mode of operation for recovering moisture from the outgoing oxidant gas stream and a second mode of operation for humidifying the incoming oxidant gas stream, and
      being connectable to the cathode outlet in the first mode and to the cathode inlet in the second mode; and
   (c) a first switch means for, for each dryer in the plurality of dryers,
      switching the dryer into and out of the second mode of operation in which the first switch means fluidly connects the dryer to the cathode inlet and obstructs fluid connection between the dryer and the cathode outlet,
      switching the dryer into and out of the first mode of operation in which the first switch means fluidly connects the dryer to the cathode outlet and obstructs fluid connection between the dryer and the cathode inlet,
   wherein, in use, the plurality of dryers includes at least one dryer in the first mode of operation, and at least one dryer in the second mode of operation.

2. A fuel cell system as claimed in claim 1, further comprising switch control means for, for each dryer in the plurality of dryers,
   controlling the first switch control means to alternate the first mode of operation with the second mode of operation such that in the first mode of operation, the dryer is operable to recover moisture from the outgoing oxidant stream to prepare the dryer for the second mode of operation, and in the second mode of operation the dryer releases moisture recovered during the first mode of operation to the incoming oxidant gas stream to prepare the dryer for the first mode of operation.

3. A fuel cell system as claimed in claim 2, wherein the switch control means is operable to control the first switch means to randomly switch each dryer in the plurality of dryers between the first mode of operation and the second mode of operation.

4. A fuel cell system as claimed in claim 2, wherein the switch control means is operable to control the first switch means to periodically switch each dryer in the plurality of dryers between the first mode of operation and the second mode of operation.

5. A fuel cell system as claimed in claim 4, wherein the switch control means is operable to control the first switch means to periodically switch at least one dryer in the first mode of operation to the second mode of operation and to simultaneously switch at least one dryer in the second mode of operation to the first mode of operation.

6. A fuel cell system as claimed in claim 4, wherein the switch control means is operable to control the first switch means to periodically switch a number of dryers from the first mode of operation to the second mode of operation and to simultaneously switch the number of other dryers from the second mode of operation to the first mode of operation, wherein the number is at least one.

7. A fuel cell system as claimed in claim 4, wherein the switch control means is operable to control the first switch means to
   periodically and sequentially switch a number of dryers from the first mode of operation to the second mode of operation, and
   simultaneously and sequentially switch the number of other dryers from the second mode of operation to the first mode of operation, wherein the number is at least one.

8. A fuel cell system as claimed in claim 1, wherein
   each dryer has a neutral position for isolating the dryer from the incoming oxidant gas stream and the outgoing oxidant gas stream; and,
   the first switch means is operable to, for each dryer in the plurality of dryers, disconnect the dryer from both the cathode inlet and the cathode outlet to switch the dryer into the neutral position.

9. A fuel cell system as claimed in claim 8, wherein the first switch means is operable to switch the connection of each dryer to the neutral position between switching the dryer from the first mode of operation to the second mode of operation, and between switching the dryer from the second mode of operation to the first mode of operation.

10. A fuel cell system as claimed in claim 2 or 8, further comprising
    an inlet port for receiving the incoming oxidant gas;
    an outlet port for discharging the outgoing oxidant gas; and
    a second switch means for, for each dryer in the plurality of dryers,
       connecting the dryer to the inlet port to introduce the incoming oxidant gas stream into the dryer when the dryer is in the second mode of operation, and
       connecting the dryer to the outlet port to receive the outgoing oxidant gas stream from the dryer when the dryer is in the first mode of operation, wherein the second switch means operates synchronously with the first switch means to permit incoming oxidant gas stream to flow into the cathode inlet and to permit outgoing oxidant gas stream to be discharged from the cathode outlet.

11. A fuel cell system as claimed in claim 10, wherein the first and second switch means are multi-way valves.

12. A fuel cell system as claimed in claim 10, wherein the plurality of dryers are contained in a dryer housing comprising a plurality of chambers divided by a plurality of dryer partition walls, and wherein exchange media is disposed in each chamber to provide the plurality of dryers.

13. A fuel cell system as claimed in claim 12, wherein
the first switch means comprises a first end housing connected to one end of the plurality of chambers of the dryer housing and a first rotary member disposed in the first end housing,
the second switch means comprises a second end housing connected to the other end of the plurality of chambers of the dryer housing, a and a second rotary member disposed in the second end housing, and
in use, the first rotary member and the second rotary member are rotatable to switching each dryer in the plurality of dryers between the first mode operation and the second mode of operation.

14. A fuel cell system as claimed in claim 13, wherein the first end housing has an associated dispersion portion having an associated open end for fluid communication with one end of the chambers of the dryer housing and an associated connection portion in fluid communication with the associated dispersion portion, and wherein the second end housing has an associated dispersion portion having an associated open end for fluid communication with the other end of the chambers of the dryer housing and an associated connection portion in fluid communication with the associated dispersion portion.

15. A fuel cell system as claimed in claim 14, wherein the first rotary member is disposed in the associated connection portion of the first end housing, and the second rotary member is disposed in the associated connection portion of the second end housing.

16. A fuel cell system as claimed in claim 15, wherein the associated dispersion portion of the first end housing has an associated plurality of compartments divided by an associated plurality of partition walls for impeding fluid communication between different compartments, and wherein, in use, each compartment in the associated plurality of compartments is positioned to adjoin a corresponding chamber in the plurality of chambers of the dryer housing for fluid communication with the corresponding chamber; and,
the associated dispersion portion of the second end housing has an associated plurality of compartments divided by an associated plurality partition walls for impeding fluid communication between different compartments, and wherein, in use, each compartment in the associated plurality of compartments is positioned to adjoin a corresponding chamber in the plurality of chambers of the dryer housing for fluid communication with the corresponding chamber.

17. A fuel cell system as claimed in claim 16, wherein the connection portion has an associated lateral dimension that is generally less than an associated lateral dimension of the dispersion portion.

18. A fuel cell system as claimed in claim 17, wherein the rotary member is dimensioned to fit within and slidingly engage an inner wall of the connection portion.

19. A fuel cell system as claimed in claim 18, wherein each of the first and second rotary members comprises an associated first segment, an associated first reduced diameter portion, an associated second segment, an associated second reduced diameter portion, and an associated third segment; an associated inner bore defining an associated inner space within the rotary member; an associated first passage extending from an associated first port in the outer wall of the second reduced diameter portion through the inner space and then to an associated second port on the outer wall of the first segment; an associated second passage extending from an associated third port on the end wall of the first segment adjacent to the first reduced diameter portion to an associated fourth port on the outer wall of the first segment; and wherein the associated first and second passages are isolated from each other.

20. A fuel cell system as defined in claim 13 wherein, in combination, the first end housing, the first rotary member, the dryer housing, the second rotary member and the second end housing provide
an intake pathway for providing fluid communication between the inlet port and the cathode inlet; and,
an outlet pathway for providing fluid communication between the cathode outlet and the outlet port;
wherein
the first end housing comprises an associated plurality of chambers and the second end housing comprises an associated plurality of chambers, and for each dryer in the plurality of dryers,
a first associated chamber in the associated plurality of chambers of the first end housing adjoins the dryer for fluid communication therewith, and
a second associated chamber in the associated plurality of chambers of the second end housing adjoins the dryer for fluid communication therewith;
the intake pathway comprises
the at least one dryer in the second mode of operation,
at least one first associated chamber for the at least one dryer in the second mode of operation, and
at least one second associated chamber for the at least one dryer in the second mode of operation; and,
the outlet pathway comprises
the at least one dryer in the first mode of operation,
at least one first associated chamber for the at least one dryer in the first mode of operation, and
at least one second associated chamber for the at least one dryer in the first mode of operation.

21. A fuel cell system as defined in claim 20 wherein
the intake pathway further comprises
a second end housing intake in the second end housing, the second end housing intake being in fluid communication with the inlet port,
a second rotary member intake pathway having an associated upstream port for receiving the incoming oxidant gas stream from the second end housing intake and an associated downstream port for discharging the incoming oxidant gas stream into the at least one second associated chamber for the at least one dryer in the second mode of operation,
a first rotary member intake pathway having an associated upstream port for receiving the incoming oxidant gas stream from the at least one first associated chamber for the at least one dryer in the second mode of operation, and an associated downstream port for discharging the incoming oxidant gas stream, and
a first end housing discharge port in fluid communication with the associated downstream port of the first rotary member intake pathway and with the cathode inlet; and, the outlet pathway further comprises
a first end housing intake in the first end housing, the first end housing intake being in fluid communication with the cathode outlet,
a first rotary member outlet pathway having an associated upstream port for receiving the outgoing oxidant gas stream from the first end housing intake and an associated downstream port for discharging the outgoing oxidant gas stream into the at least one first associated chamber for the at least one dryer in the first mode of operation,
a second rotary member outlet pathway having an associated upstream port for receiving the outgoing oxidant gas stream from the at least one second associated chamber for the at least one dryer in the first mode of operation and an associated downstream port for discharging the outgoing oxidant gas stream, and,
a second end housing discharge port in fluid communication with the associated downstream port of the second rotary member outlet pathway and with the outlet port.

22. A fuel cell system as defined in claim 21 wherein
for each dryer in the plurality of dryers, the first rotary member and the second rotary member are operable to rotate to switch the dryer into the second mode of operation wherein
the associated downstream port of the second rotary member intake pathway is in fluid communication with the second associated chamber for fluid communication therewith,
the associated upstream port of the second rotary member outlet pathway is offset from the second associated chamber to obstruct fluid communication therewith,
the first associated upstream port of the first rotary member intake pathway is in fluid communication with the first associated chamber for fluid communication therewith, and
the associated downstream port of the first rotary member outlet pathway is offset from the first associated chamber to obstruct fluid communication therewith; and,
for each dryer in the plurality of dryers, the first rotary member and the second rotary member are operable to rotate to switch the dryer into the first mode of operation wherein,
the associated downstream port of the first rotary member outlet pathway is in fluid communication with the first associated chamber for fluid communication therewith,
the associated upstream port of the first rotary member intake pathway offset is offset from the first associated chamber to obstruct fluid communication therewith,
the associated upstream port of the second rotary member outlet pathway is in fluid communication with the second associated chamber for fluid communication therewith, and
the associated downstream port of the second rotary member outlet pathway is offset from the second associated chamber to obstruct fluid communication therewith.

23. A fuel cell system as claimed in claim 22, wherein the first and second rotary members rotate in phase during operation.

24. A fuel cell system as claimed in claim 23, wherein the switch control means comprises a shaft, and the first and second rotary members are fixed onto the shaft to rotate in phase together with the shaft.

25. A fuel cell system as claimed in claim 19, wherein sealing means is provided between the first rotary member and the associated connection portion of the first end housing, and between the second rotary member and the associated connection portion of the second end housing.

26. A fuel cell system as claimed in claim 25, wherein sealing means is provided between each of the associated first, second and third segment of the first rotary member and the associated inner wall of the associated connection portion of the first end housing; and between each of the associated first, second and third segment of the second rotary member and the associated inner wall of the associated connection portion of the second end housing.

27. A fuel cell system as claimed in claim 1, wherein the fuel cell further comprises a recirculation conduit including
a pump for recirculating the fuel gas, the pump being connected to the recirculation conduit between the anode inlet and the anode outlet; and
a water separator provided in the recirculation conduit for separating water from the fuel gas exiting the anode; and a
a first fuel inlet connected to the recirculation conduit downstream from the pump and the water separator, for supply of the fuel gas.

28. A fuel cell system as claimed in claim 27, wherein the fuel cell further comprises a branch conduit connected to the recirculation conduit and a dryer in the branch conduit, the branch conduit including a vent outlet for purging accumulated and unwanted gases from the anode.

29. A fuel cell system as claimed in claim 28, wherein the fuel cell further comprises a shut-off valve in the branch conduit, upstream of the dryer for controlling flow of fuel gas to the dryer, the shut-off valve being operable to effect purge cycles to purge accumulated and unwanted gases from the anode.

30. A fuel cell system as claimed in claim 27, wherein the fuel cell further comprises a dryer in the recirculation conduit, downstream from the water separator.

31. A fuel cell system as claimed in claim 30, wherein the fuel cell further comprises a branch conduit connected to the recirculation conduit, downstream from the dryer and wherein the branch conduit includes a vent outlet for purging accumulated and unwanted gases from the anode and a shut-off valve for controlling purging via the vent outlet.

32. A fuel cell system as claimed in claim 28, wherein the branch conduit is connected to the recirculation conduit upstream from the pump.

33. A fuel cell system as claimed in claim 31, wherein the branch conduit is connected to the recirculation conduit upstream from the pump.

34. A fuel cell system as claimed in claim 29, wherein the branch conduit includes a second fuel inlet between the dryer and the vent outlet for providing reverse flow of the fuel gas through the dryer to recharge the dryer and to recover moisture therefrom, and a second shut-off valve between the second fuel inlet and the vent outlet, for controlling reverse flow of the fuel gas through the dryer to recharge the dryer and to recover moisture therefrom.

35. A fuel cell system as claimed in claim 34, wherein the branch conduit includes a fuel control valve in the second fuel inlet, for control thereof.

* * * * *